(No Model.) 2 Sheets—Sheet 1.
T. S. MILLER & J. G. DELANEY.
CONVEYING APPARATUS.
No. 585,964. Patented July 6, 1897.
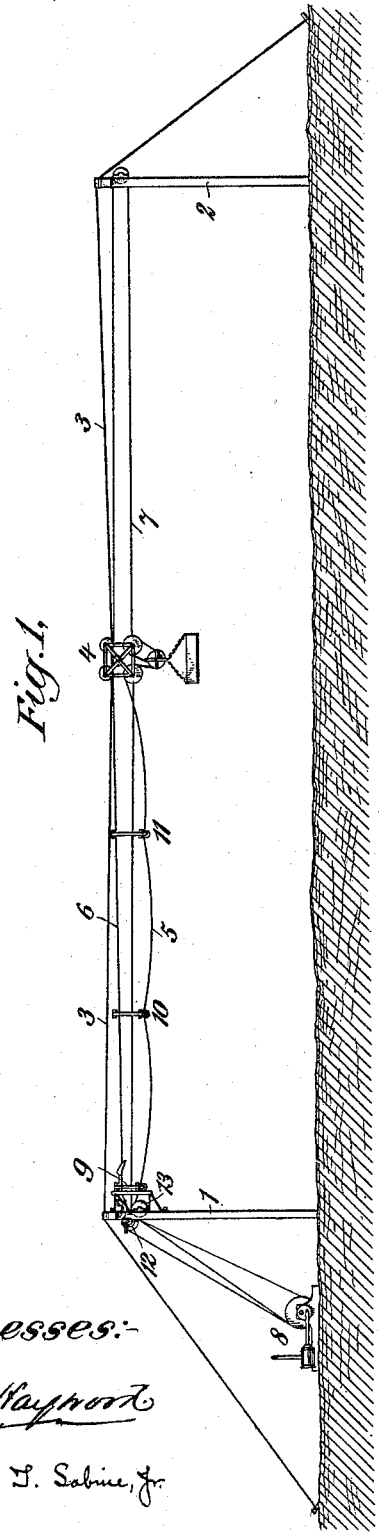
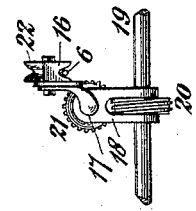
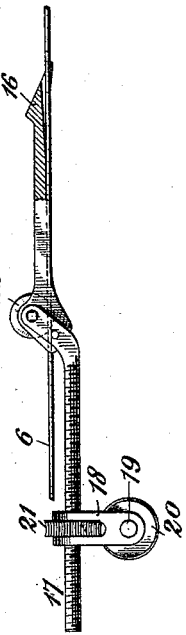
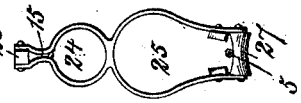
Witnesses:
D. H. Hayward
William T. Sabine, Jr.
Inventors
Thomas Spencer Miller
James G. Delaney
by Gifford & Bull
Attys (No Model.) 2 Sheets—Sheet 2.
T. S. MILLER & J. G. DELANEY.
CONVEYING APPARATUS.
No. 585,964. Patented July 6, 1897.
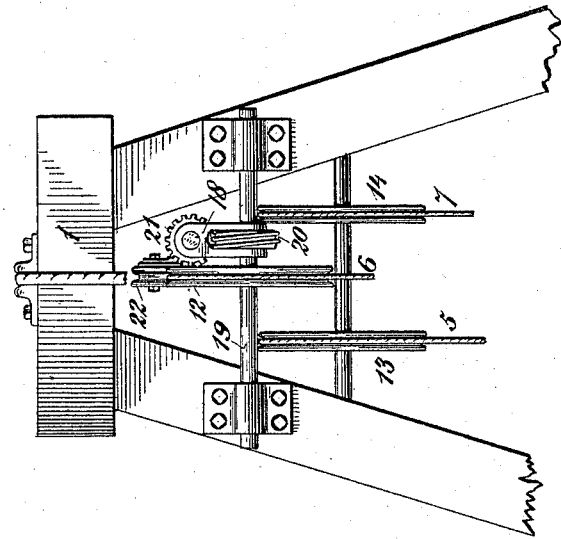
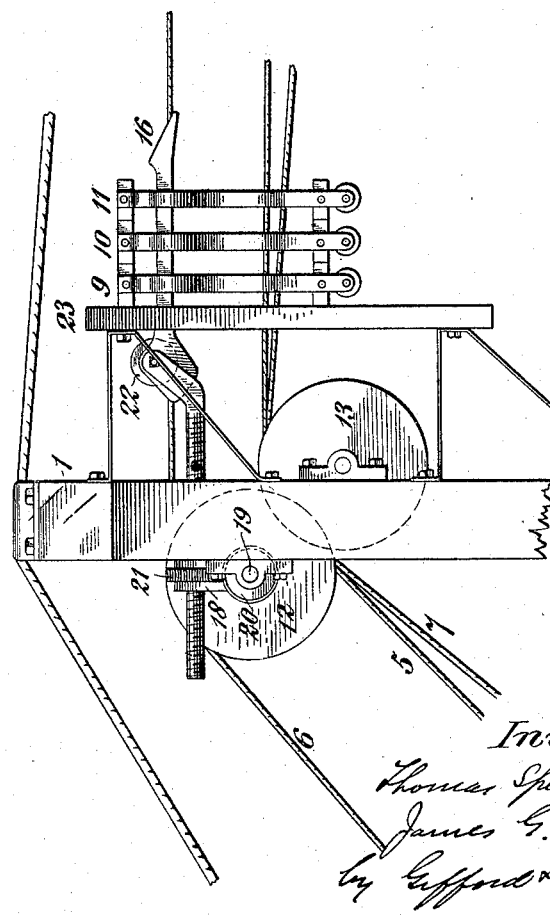
Witnesses:—
D. H. Hayward
William J. Sabine Jr.
Inventors
Thomas Spencer Miller
James G. Delaney
by Gifford & Bull Attys.

UNITED STATES PATENT OFFICE.

THOMAS SPENCER MILLER, OF SOUTH ORANGE, NEW JERSEY, AND JAMES G. DELANEY, OF NEW YORK, N. Y.

CONVEYING APPARATUS.

SPECIFICATION forming part of Letters Patent No. 585,964, dated July 6, 1897.

Application filed March 2, 1895. Serial No. 540,279. (No model.)

*To all whom it may concern:*

Be it known that we, THOMAS SPENCER MILLER, of South Orange, Essex county, State of New Jersey, and JAMES G. DELANEY, of New York, in the county of New York and State of New York, have invented certain new and useful Improvements in Conveying Apparatus, of which the following is a specification.

Figure 1 is a side view of the apparatus; Fig. 2, a detail of the top of the inner tower and the apparatus adjacent thereto. Fig. 3 is an end view of the same. Fig. 4 is an end view of a rope-carrier detached. Figs. 5 and 6 are details.

1 is the inner or head tower.
2 is the outer or tail tower.
3 is the cable.
4 is the carriage.
5 is the fall-rope.
6 is the end of the rope attached to the inner side of the carriage for propelling it.
7 is the end of the same rope attached to the outer side of the carriage.
8 is the rope-drum apparatus by which the rope 6 7 and rope 5 are actuated.

The rope 6 7 we will refer to as the "traction-rope," it being the rope for the traction of the load-carriage.

9, 10, and 11 are fall-rope carriers, each of which is of the construction shown in Fig. 4. In Fig. 1 two of these fall-rope carriers are shown out upon the span, and in Fig. 2 all of them are shown as collected at the inner tower.

12, 13, and 14 are the sheaves supported by the inner tower that carry the ropes 6, 5, and 7, respectively.

Each of the fall-rope carriers, as shown in Fig. 1, is supported by the rope 6. The sides of the carrier converge to an apex at the top, so that when the carrier rests upon the rope 6 it grasps the rope and is forcibly carried along by it. This force may be intensified by making the sides of the carriage sufficiently thin to yield and thus act as a spring-clip to grasp the rope. The sides of the carrier at the top also produce a slotted opening 15, adapted to receive the horn 16. This horn contains an upward projection near its outer end, which upward projection is inclined front and rear, and as the horn enters the opening 15 of each rope-carrier the rope-carrier runs over this projection and is lifted off of the rope 6 and supported by the horn 16, as shown in Fig. 2.

By our present invention we provide means whereby the rope-carriers are successively and at proper intervals automatically released and permitted to be carried outward by the traveling rope 6, and in the form constructed in the drawings this invention is embodied in the following mechanism connected with the horn 16: The shank of the horn 16 is rigidly connected with a rod 17, turning in the support 18, which is pivotally mounted upon the shaft 19. The shaft 19 is fixed to the sheave 12, so as to revolve therewith, and to the shaft 19 is fixed a worm-wheel 20, which drives a gear 21, which is screw-threaded to the rod 17. Thus as the sheave 12 is driven in one direction by the outward movement of the rope 6 the horn 16 will be drawn inwardly toward the tower 1, whereas the reverse movement of the horn will take place when the rope 6 travels inwardly.

The rod 17, the support 18, and the shaft 19, with its bearings upon the head-tower 1, constitute one form of means whereby the retainer 16 is secured at a determined point of the span independently of the load-carriage. The screw-thread on the rod 17 and the worm on the worm-wheel 20 constitute one form of means whereby a relative movement is produced between the retainer 16 and the pusher 23.

The elevation of the horn may be controlled by the roller 22, mounted thereon and running on the rope 6—that is to say, any variation in the position of the rope 6 will be responded to by a corresponding variation in the position of the roller 22 and the horn 16, so that the relative position of the horn 16 and the rope 6 will remain substantially constant and proper for the engagement between the rope-carriers and the horn. The horn 16 therefore constitutes a retainer or movable support for the rope-carriers, and the wheel 22 constitutes a rest connected with said support, whereby the position of said support is regulated by the rope 6. Thus the same rope that supports the rope-carriers when out on the span determines the position of the horn and insures that the horn will always be in proper position to receive the rope-carriers as they return from each excursion. 23 is an abutment by which the horn projects and which serves as a stripper or pusher to strip the rope-carriers one by one off the horn as the outward movement of the rope 6 draws the horn inward. The abutment, stripper, or pusher 23 constitutes one form of means whereby the carrier is released from the retainer 16 by the movement of the sheave 12 (speaking without limitation to the means employed for moving the sheave) or the traveler-rope 6, (speaking without limitation to the sheave or other particular means for transmitting the motions of the traveler-rope to a relative movement between the retainer 16 and the pusher or abutment 23.) The rope 6 being a rope extending from the head of the span to the load-carriage, we do not wish to be limited to its function also as the traveler-rope, which function is not altogether essential to its production of the mode of operation above referred to. By this mode of operation and by a proper proportionment of the parts it will be seen that one of the rope-carriers may be pushed off the end of the horn for every given number of feet that the rope 6 advances. Since each rope-carrier is so constructed that it grips the rope 6 as soon as it is pushed off the horn, the rope-carriers will be carried out upon the span at predetermined intervals. In other words, the rope 6, being attached to the carriage and moving in unison with it, actuates the sheave 12 in unison with the movements of the carriage, and this movement of said sheave 12 causes the release of the carrier by means of the train of mechanism producing a relative movement between the horn, retainer, or support 16 and the abutment, stretcher, or pusher 23.

The rope-carriers are preferably constructed to provide the separate openings 24 and 25 for the traveling rope and the fall-rope, respectively, these openings being formed in a single casting or forging, as shown, provided with a top passage-way into the opening 24 and a bottom passage-way into the opening 25. The top passage-way is closed by the member 26, that rests on top of the horn, and the bottom passage-way is closed by the member 27, upon which the fall-rope rests.

We do not desire to limit ourselves to the details of construction or of operation that we have referred to in describing our invention. Among other things, for example, it may be mentioned that the motion whereby the carriers are successively transferred, started, or released from a support or retainer near the tower is a motion that may be imparted to a part or parts of great variety.

We do not intend in this application to claim anything shown or described in our Patent No. 458,183, dated August 25, 1891.

We claim—

1. In a conveying apparatus, in combination, a cable or track way, the supports therefor, a load-carriage, a rope-carrier, a support for said rope-carrier, means whereby said support is secured at a point toward and from which said load-carriage travels, a pusher whereby said rope-carrier is discharged from said support, a rope extending from the head of the span to the load-carriage and means whereby the movement of said rope produces a relative movement between said support and said pusher, substantially as described.

2. In a conveying apparatus, in combination, a rope-carrier, a rope whereby said carrier is supported, a movable support for said rope-carrier toward and from which the load-carriage travels, a rest connected with said movable support and resting upon said rope whereby the position of said support is regulated by said rope and means whereby said movable support is secured at or near a determined point of the span independently of the load-carriage, substantially as described.

3. In a conveying apparatus, in combination, a cable or track way, a load-carriage, a rope-carrier, a rope-carrier support, a stationary pusher and means whereby said support is retracted to discharge the carrier therefrom, substantially as described.

4. In a conveying apparatus, in combination, a cable or track way, the supports therefor, a load-carriage, a rope-carrier, a double-inclined projection extending into the path of said carrier, means whereby said projection is secured at a point toward and from which the load-carriage travels, a pusher and means whereby a relative movement is produced between said pusher and said projection to force the carrier over said projection, substantially as described.

5. In a conveying apparatus, in combination, a cable or track way, the supports therefor, a load-carriage, a rope-carrier, a double-inclined projection extending into the path of said carrier, means whereby said carrier is secured at a point toward and from which the carriage travels, a pusher, a rope extending from the head-support to the carriage and a screw actuated by said rope whereby a relative motion is produced between said projection and said pusher, substantially as described.

6. In a conveying apparatus, in combination, a cable or track way, the supports therefor, a load-carriage, a rope-carrier, a rope-carrier support, means whereby said rope-carrier support is secured at a point toward and from which the load-carriage travels, a rope extending from the head-support to the load-carriage, a screw and means whereby said screw is actuated from said rope whereby said carrier is released from its support, substantially as described.

7. In a conveying apparatus, in combination, the cable or track way, the load-carriage, the fall-rope, the traction-rope and a fall-rope carrier supported by said traction-rope, substantially as described.

8. A rope-carrier frame consisting of two connected loops open at top and bottom constructed of a single piece of metal, in combination with a separate rope-rest 27 whereby the bottom opening is bridged and a separate member 26 whereby the top opening is bridged, substantially as described.

9. In a conveying apparatus the combination of a way, a rope-support, a running line, mechanism stationarily located with respect to the supports of the apparatus, and the following parts located on said mechanism, viz: a retainer, a pusher, and means operatively connected with said running line whereby a relative motion is produced between said pusher and retainer substantially parallel with said way, substantially as set forth.

10. In a conveying apparatus the combination of a way, a rope-support, a running line, mechanism stationarily located with respect to the supports of the apparatus, and the following parts located on said mechanism, viz: a retainer whereby the rope-carrier is lifted out of engagement with said running rope, a pusher, and mechanism operatively connected with said running rope whereby a relative movement is produced between said retainer and pusher, substantially as described.

11. In a conveying apparatus, the combination of a way, a running line, a rope-support mounted upon said running line, and mechanism stationarily located relatively to the supports of the apparatus for automatically discharging said rope-supports onto said running line, as a support, substantially as described.

12. In a conveying apparatus, the combination of a way, a running line, a rope-support clutching said running line with the assistance of its own weight, and mechanism stationarily located relatively to the supports of the apparatus for automatically discharging said rope-supports into connection with said running line, substantially as described.

13. In a conveying apparatus, the combination of a way, a running line, a rope-support mounted upon said running line, mechanism stationarily located relatively to the supports of the apparatus for automatically discharging said rope-support into connection with the running line, and means on said rope-support whereby it may fixedly engage said running line by which it is supported, substantially as described.

14. In a conveying apparatus, the combination of a way, a running line, a rope-support mounted upon said running line, and the following mechanism stationarily located relatively to the supports of the apparatus, viz: a retainer, a pusher, and mechanism operatively connected with said running line whereby the relative motion is produced between said retainer and pusher, substantially parallel with said way, substantially as set forth.

15. In a conveying apparatus, in combination, a way, a load-carriage, a traction-rope connected therewith, a rope-carrier and a horn extending adjacent to said traction-rope, substantially as set forth.

16. In a conveying apparatus, in combination, a way, a load-carriage, a traveling rope, a rope-carrier, a holder stationarily located relatively to the supports of the apparatus whereby said rope-carrier is picked up and supported and a member on said rope-carrier whereby it is supported on said running rope when not supported by said holder; said member being provided with converging sides adapted to clamp said running rope and hold the carrier stationary thereon, substantially as described.

17. In a conveying apparatus, in combination, a way, a load-carriage, a rope-carrier, a holder stationarily located relatively to the supports of the apparatus whereby the rope-carrier is engaged and held, means whereby the rope-carrier is disengaged from said holder, and a running rope to which the support of said carrier is transferred when disengaged from said holder, substantially as described.

18. In a conveying apparatus, in combination, a way, a load-carriage, a traction-rope connected with the load-carriage, a horn 16 provided with the wheel 22 resting on said traction-rope, substantially as described.

19. In a conveying apparatus, the way, the load-carriage, the traction-rope connected therewith, the horn 16, the abutment 23, the screw 17 connected with said horn, the nut 21 on said screw and means for operating said nut, substantially as described.

20. In combination with a rope 6, a horn 16 extending longitudinally over said rope, a wheel 22 running on said rope and carrying said horn and means whereby said horn is reciprocated longitudinally of said rope, substantially as described.

21. In combination, a horn 16 provided with an underneath longitudinal channel, a rope 6 running in said channel and means whereby said horn is reciprocated longitudinally of said rope, substantially as described.

THOS. SPENCER MILLER.
   JAMES G. DELANEY.

Witnesses:
 M. WILSON,
 WILLIAM T. SABINE, Jr.